United States Patent
Goldman

(10) Patent No.: US 8,381,483 B1
(45) Date of Patent: Feb. 26, 2013

(54) TERRAZZO PROCESS FOR EXISTING CONCRETE SURFACES

(76) Inventor: Nancy Goldman, Newport Beach, CA (US)

(*) Notice: Subject to any disclaimer, the term of this patent is extended or adjusted under 35 U.S.C. 154(b) by 575 days.

(21) Appl. No.: 12/386,850

(22) Filed: Apr. 23, 2009

(51) Int. Cl.
*E04G 23/00* (2006.01)
*B05D 1/36* (2006.01)

(52) U.S. Cl. .......... 52/741.41; 52/742.14; 427/136; 427/204; 427/270; 427/292; 427/309; 427/403

(58) Field of Classification Search .......... 52/741.14, 52/741.41, 742.13, 742.14, 742.16, 745.21; 427/203, 204, 205
See application file for complete search history.

(56) References Cited

U.S. PATENT DOCUMENTS

| | | | | |
|---|---|---|---|---|
| 2,374,562 A * | 4/1945 | Owens | ..... | 106/733 |
| 3,246,057 A * | 4/1966 | Simonson | ..... | 264/35 |
| 3,360,493 A * | 12/1967 | Evans | ..... | 524/5 |
| 3,423,224 A * | 1/1969 | Santucci et al. | ..... | 427/136 |
| 3,503,311 A * | 3/1970 | Gagle et al. | ..... | 404/74 |
| 3,552,988 A * | 1/1971 | Boiardi | ..... | 427/204 |
| 3,723,163 A * | 3/1973 | Schumacher | ..... | 428/217 |
| 4,626,562 A * | 12/1986 | Motomura et al. | ..... | 523/466 |
| 5,476,340 A * | 12/1995 | Contrasto | ..... | 404/75 |
| 5,771,557 A * | 6/1998 | Contrasto | ..... | 29/402.11 |
| 6,491,852 B1 * | 12/2002 | Sedaka | ..... | 264/35 |
| 6,770,328 B1 * | 8/2004 | Whaley | ..... | 427/407.1 |
| 2007/0282046 A1 * | 12/2007 | Killilea et al. | ..... | 524/261 |

* cited by examiner

*Primary Examiner* — Brian Glessner
*Assistant Examiner* — Adriana Figueroa
(74) *Attorney, Agent, or Firm* — David G. Duckworth; Russo & Duckworth, LLP

(57) ABSTRACT

An improved terrazzo process for applying terrazzo to an existing concrete surface comprising preparing the concrete surface, applying two coatings of primer agent, applying a layer of mortar, smoothing out and leveling the mortar topping layer, applying decorative aggregate to the mortar topping layer, troweling the aggregate into the mortar topping layer, grinding and polishing the cured aggregate/topping layer, and sealing the terrazzo finish.

19 Claims, 3 Drawing Sheets

TERRAZZO PROCESS FOR EXISTING CONCRETE SURFACES

FIELD OF INVENTION

The present invention is directed to an improved process for creating Terrazzo floors, patios, and horizontal panels on existing concrete surfaces.

BACKGROUND OF THE INVENTION

Terrazzo floors and panels are used extensively today for architectural purposes. Terrazzo floors date from early neolithic buildings (9.000-8.000 BC) in Western Asia, such as in Turkey. Other sites with early neolithic terrazzo floors have been found in the eastern Mediterranean. The neolithic terrazzo floors were constructed of burnt lime, crushed limestone, and clay, colored red with ochre, and polished. The embedded crushed limestone gives these terrazzo floors a slightly mottled appearance. Interestingly, the production of burnt lime for these early terrazzo floors predates the firing of pottery by almost a thousand years. These floors are almost impenetrable to moisture and are very durable, but their construction involved a high input of heat energy to produce the burnt lime.

In the 1400s terrazzo reappeared as a low cost flooring material. Marble chips were set in clay. Goat milk was used as a sealer. In the 1800's portland cement started to be used in Terrazzo. Installation of Terrazzo became much easier and more extensive after the introduction of electric industrial grinders and other power equipment in the twentieth century. It was a very popular finish in the 1930's 1940's and the 1950's. Examples are the side walks along the beach front in Rio De Janiro and the large theaters and restaurants build between the late 30s and late 50s in the United States.

Today, exterior terrazzo floors are usually constructed by embedding marble chips and other aggregate in concrete and then exposing the marble chips and other fine aggregates on the surface of finished concrete or by grinding and polishing the concrete surface. Much of the preliminary work of terrazzo fabrication involves the laying of traditional concrete pad and flooring. The method is time driven. Conventional marble-chip, cementious terrazzo, rustic terrazzo, requires three layers of materials. First, a solid, level concrete pad or flooring foundation, 3 to 4 inches thick, is laid. Before the concrete has set up, the concrete surface is raked to give the surface bite for the next step. Then, and before the concrete has set up, a 1-inch layer of sandy concrete topping is applied to the raked concrete surface. For the final layer, a mixture of cement and fine aggregate is blended and placed on the top of the concrete mortar topping layer before it sets up to from a surface layer. While this surface layer is still wet, additional aggregate is broadcast on the surface to insure adequate coverage and uniform density of chips. A lightweight roller is then rolled over the entire surface to give a flat surface. When design elements are incorporated in the terrazzo finish, the different color mixtures of concrete and aggregate are prepared and then applied over the mortar topping layer in prescribed sections to create the design. Then matching aggregate is hand seeded into the different sections to achieve a uniform density of aggregate and color. Terrazzo design flooring is very labor intensive.

In addition to marble aggregate blends, other aggregate blends can be used such as colored rock or pebbles, recycled glass, shaped metal, like bolts and screws, and medallions, can be used in terrazzo. However when metal particles are used, corrosion resistant metals, such as bronze, stainless steel must be used to prevent staining and/or corrosive destruction. Reactive metals, like steel, expand when corroded and break up the terrazzo.

When the rustic terrazzo is thoroughly dry, the upper surface is ground with a terrazzo grinder to give a smooth even finish. The surface is then cleaned, polished with a terrazzo polisher, and/or sealed.

A major limitation to exterior cementious terrazzo is that it can only be applied to a fresh, new, clean concrete surface, i.e. the raked concrete surface of a new pad or flooring. The installation of exterior cementious terrazzo on the surface of an existing concrete pad or flooring has not been successful. Cracking and delamination are common problems. Because of such problems, most construction companies will refuse to apply terrazzo over an existing concrete surface, or will refuse to furnish a warranty for a terrazzo finish over an existing concrete surface.

In addition, although terrazzo is ideally suit to create complex designs in surfaces, such designs require careful application of the final layer and the seeding of the various aggregates to keep sharp boundaries between design elements and insure that different colored aggregate to do cross over to adjacent elements of the design. Frequently saw cuts are used to sharpen and demark boundaries between design elements.

Rustic terrazzo fabrication require at least 24 hours of set up time before it can be safely subject to foot and light traffic and at least 72 hours before it can be subject to vehicle and heavy traffic. Maximum strength for concrete is reached in 28 days.

It is an object of the present invention to provide a process to apply a terrazzo finish to an existing horizontal concrete surface with an insignificant thickness and weight penalty. Thus, the present method permits the application of a terrazzo finish to an existing concrete structure and does not require the laying of a new concrete pad or floor. Thus, for example, an existing mall concrete flooring can be refinished without the need to lay a brand new 3 to 4 inch concrete pad over the existing concrete floor or demolishing the existing concrete flooring to install the new concrete flooring. When a second pad is applied all over an existing pad, door threshold have to be adjusted. Frequently structural limitations will not permit the laying of a second concrete pad over an existing concrete pad or floor because of the added weight.

It is a further object of the present invention to provide a method applying a terrazzo without time constraints. In other words, the present method does not require the laying down of three layers of cementious material before they have set up as required in the rustic terrazzo method.

It is an additional object of the present invention to provide a terrazzo finish that can be subject to foot and light traffic four hours after application and to vehicle and heavy traffic six hours after application. Thus, for example, an exterior or interior mall can be resurface in terrazzo at night when the mall is closed and open to traffic the next morning after 4 or 6 hours as the case may be for light traffic or heavy traffic.

It is a further object to provide a process for apply a terrazzo finish to a horizontal surface that can accomplish the desired result in a minimum amount of time and with an efficient use of labor.

It is another object of the present invention to provide a terrazzo process that allows the design in a terrazzo finish to be made in a single step without the need to first render the design with the application of a mixture of aggregate and cement to form the final layer and then secondly seed the final layer with additional aggregate to made the aggregate density and color uniform. Both these steps are labor intensive.

SUMMARY OF THE INVENTION

The present invention is directed to a method of resurfacing the upper horizontal surface of a substantially rigid concrete body with a terrazzo finish comprising the steps of:

Treating the upper horizontal surface of the substantially rigid concrete body by physical means to expose a clean roughened surface;

Filling at least the top portions of all exposed open cracks in the upper horizontal surface, level with the surface, with a primer agent;

Filling the crevices in the upper horizontal concrete surface level with the upper horizontal surface with crack filler prior to applying the first coating of primer agent;

Applying a coating of primer agent over the clean roughened surface to form a base primer coating on the clean roughened surface;

Applying a layer of cementious mortar topping at least about 1/16 inch thick over the base primer coating before it has set up;

Screeding the applied cementious mortar topping to form a relatively uniform topping layer;

Seeding decorative aggregate onto the mortar topping layer to form a seeded mortar topping layer;

Troweling the surface of the seeded mortar topping layer to fully or partially embed the decorative aggregate into the mortar topping layer;

Allowing the troweled seeded mortar topping layer to cure for at least four hours to form a substantially cured troweled seeded mortar topping layer;

Cutting joints through the cured smooth seeded mortar topping layer contiguous with the existing joints in the substantially rigid body; and Finishing the cured troweled seeded mortar topping layer.

Optionally the upper horizontal surface of the concrete body is treated with chemical cleaning agents to remove dirt and organic residue from the upper surface prior to treating the surface to physical means.

Preferably the upper horizontal surface is treated with physical means elected from the group consisting of chipping, grinding, sanding, shotting, high pressure water etching, sand blasting, glass bead blasting, and/or scrapping to expose a clean roughened upper horizontal concrete surface.

Preferably the topping is a topping comprising silica sand, calcium aluminate, calcium carbonate, calcium sulfate dehydrate, hydraulic cement and water.

The decorative aggregate is selected from the group consisting of glass particulates, marble particles, metal particles, abalone shell particulates, pebble rock, stones, pebbles, coarse sand having a maximum mean diameter no greater than twice the thickness of the primer agent. The thickness of the topping layer is dictated by the size of the aggregate and the desired design. The mesh size of the decorative aggregate can vary from a mesh size approximately twice the thickness of the cementious mortar topping layer to a mesh size approximately equal to the thickness of the cementious mortar topping layer or less. By mesh size what is meant is the sieve opening dimension that the aggregate will pass through. Sieve designation is normally given under the U.S. Sieve Series (A. S. T. M.) or the Tyler equivalents. Thus an aggregate size of 1/4 inch means the aggregate that will pass a 1/4 inch (6.35 mm) sieve which has sieve openings of a 1/4 inch. For cost, weight and threshold thickness considerations, the topping layer will normally be equal to or not less than about one-half the aggregate mesh size. When a fine aggregate is used, the thickness of the cementious mortar topping layer will normally be the mesh size of the aggregate. When the design calls for large cross sections of the aggregate to be exposed in the finished terrazzo surface, the cementious mortar topping layer will normally be thick enough to trap the aggregate but less than the aggregate mesh size. Thus where it is desired to expose the maximum cross section of the aggregate, the maximum diameter of the aggregate can be about twice as great as the thickness of the mortar topping layer. The troweling of the cementious mortar topping layer following the seeding with decorative aggregate embeds the decorative aggregate in the cementious mortar topping to trap the aggregate. The aggregate can be partially or fully embedded in the cementious topping depending upon the thickness of the topping and the mesh size of the aggregate.

Preferably the joints cut through the cured smooth seeded mortar topping layer are grouted with grouting agent to the upper surface of the troweled seeded mortar topping layer prior to finishing the cured troweled seeded mortar topping layer.

Preferably the cured smooth seeded mortar topping layer is finished by grinding and polishing the surface of the cured troweled seeded mortar topping layer after the mortar topping layer has cured. Curing for this step can occur in 4 hours, but preferably the troweled seeded mortar topping layer is allowed to cure for at least 12 hours before grinding and polishing.

Preferably the cured smooth seeded mortar topping layer is sealed by the application of concrete sealer after the grinding and polishing, but this is optional.

Most preferably, the cured smooth seeded mortar topping layer is finished by grinding and polishing the cured smooth seeded mortar topping layer smooth and sealed by application of a concrete sealer to bring out the decorative values of the decorative aggregate in the surface of the cured smooth seeded mortar topping layer.

In the preferred embodiment of the present invention, the upper horizontal concrete surface of a substantially rigid concrete body is resurfaced with terrazzo by:

Treating the upper horizontal concrete surface of the substantially rigid concrete body by physical means to expose a clean roughened concrete surface;

Filling at least the top portions of all cracks in the upper horizontal surface, level with the surface, with a primer agent;

Filling the crevices in the upper horizontal concrete surface level with the upper horizontal concrete surface with crack filler prior to applying the primer coating of primer agent;

Applying a primer coating of primer agent over the upper horizontal concrete surface;

Allowing sufficient time for the primer coating to become sticky;

Applying a mortar topping comprising silica sand, calcium aluminate, calcium carbonate, calcium sulfate dehydrate, hydraulic cement and water over the base primer coating to form a mortar topping layer on the upper horizontal surface having a thickness at least about 1/8 inch thick over primer coating when the base primer agent coating is tacky;

Seeding decorative aggregate onto the smooth mortar topping layer to form a seeded mortar topping layer;

Troweling the surface of the seeded mortar topping layer even to partially or fully embed the decorative aggregate into the mortar topping layer;

Cutting joints through the cured smooth seeded mortar topping layer contiguous with the existing joints in the substantially rigid body;

Allowing the troweled seeded mortar topping layer to cure for at least about 12 hours to form a substantially cured troweled seeded mortar topping layer; and Finishing the cured troweled seeded mortar topping layer.

DESCRIPTION OF THE INVENTION

Figure 1:
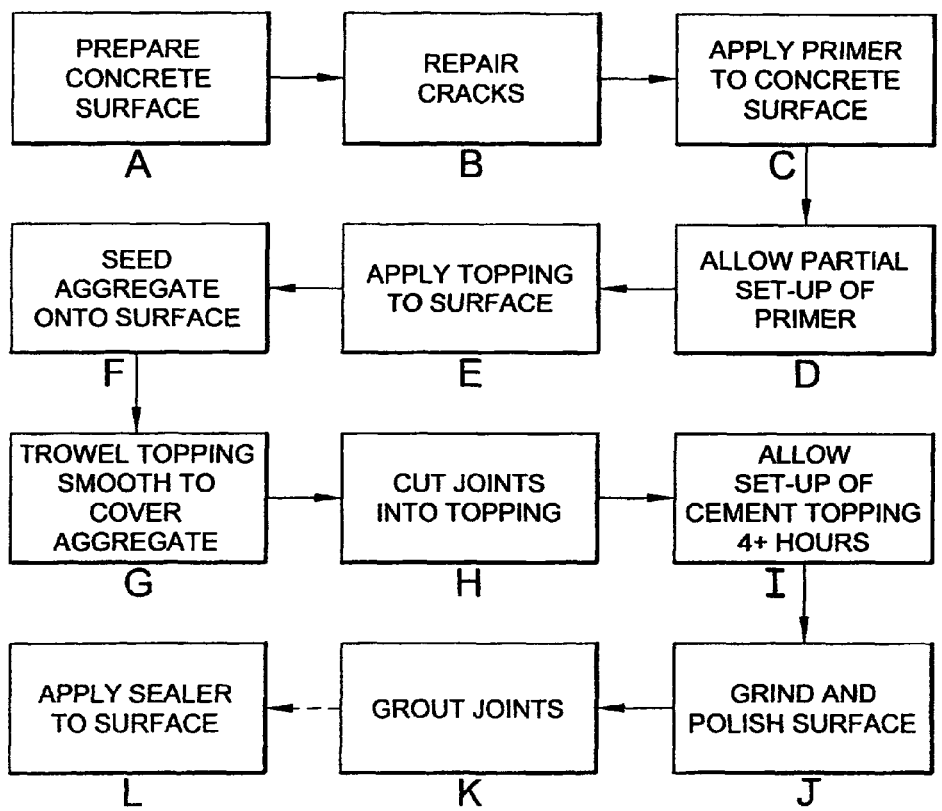
FIG. 1 is a flow diagram of the method of the present invention.
Figure 2:
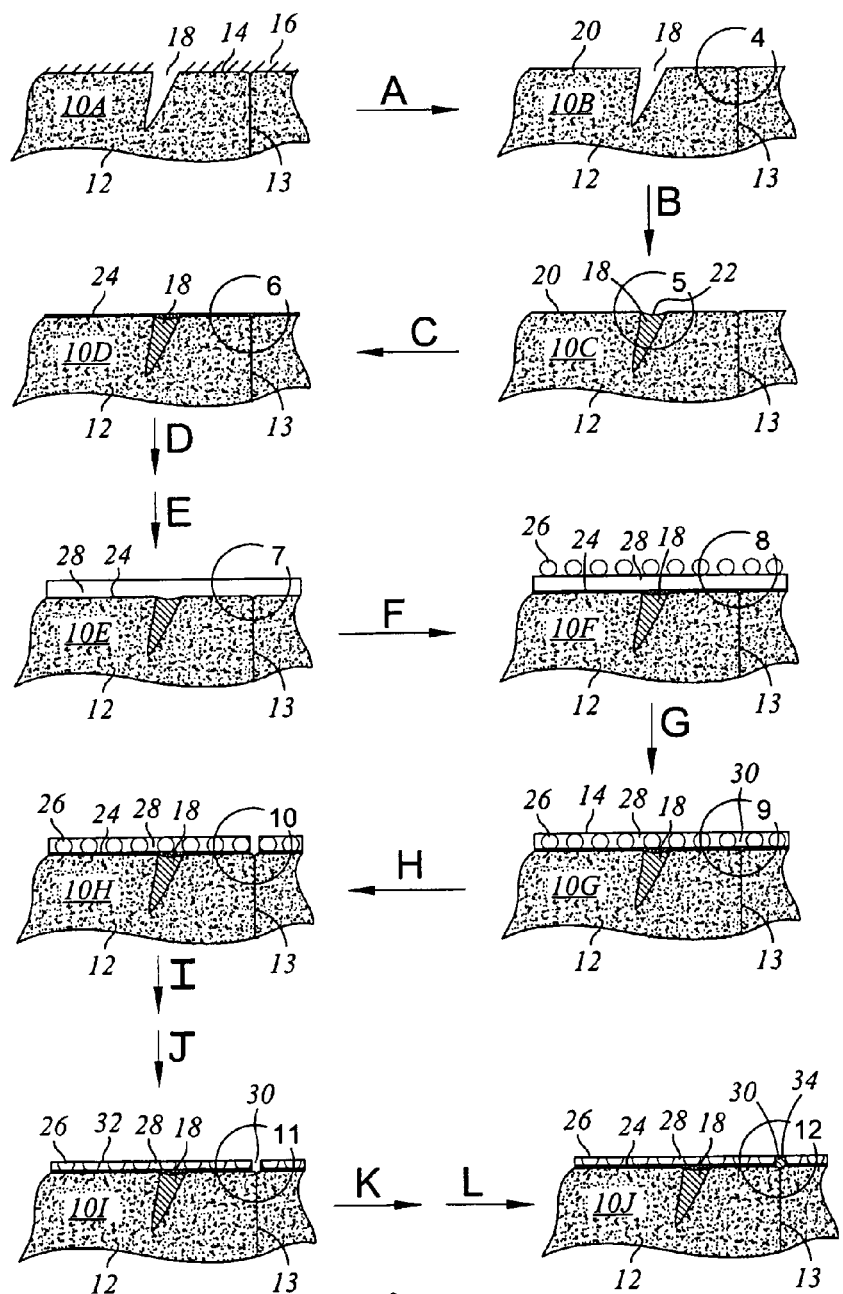
FIG. 2 is a cross-sectional pictorial flow diagram of the method of FIG. 1.
Figure 3:
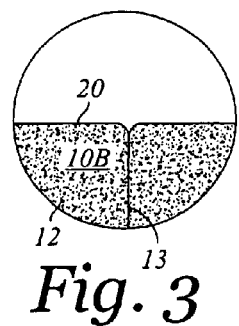
FIG. 3 is an enlarged view of the encircle area 4 of the second cross-sectional view of FIG. 2.
Figure 4:
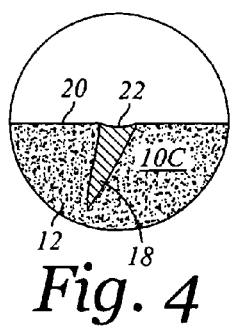
FIG. 4 is an enlarged view of the encircle area 5 of the third cross-sectional view of FIG. 2.
Figure 5:
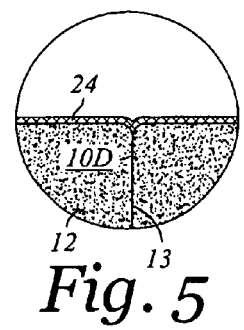
FIG. 5 is an enlarged view of the encircle area 6 of the fourth cross-sectional view of FIG. 2.
Figure 6:
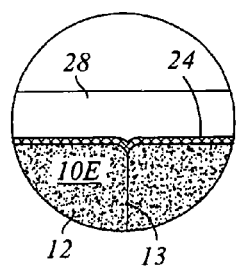
FIG. 6 is an enlarged view of the encircle area 7 of the fifth cross-sectional view of FIG. 2.
Figure 7:
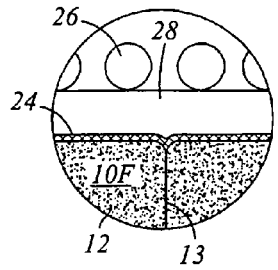
FIG. 7 is an enlarged view of the encircle area 8 of the sixth cross-sectional view of FIG. 2.
Figure 8:
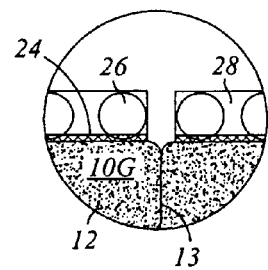
FIG. 8 is an enlarged view of the encircle area 9 of the seventh cross-sectional view of FIG. 2.
Figure 9:
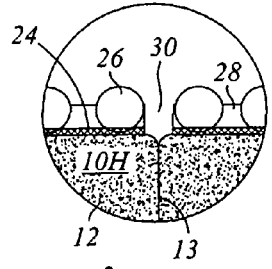
FIG. 9 is an enlarged view of the encircle area 10 of the eighth cross-sectional view of FIG. 2.
Figure 10:
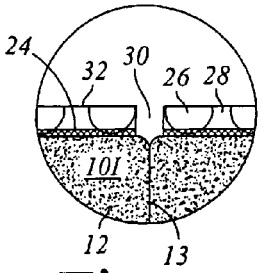
FIG. 10 is an enlarged view of the encircle area 11 of the ninth cross-sectional view of FIG. 2.
Figure 11:
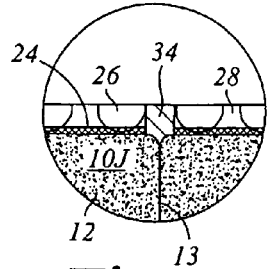
FIG. 11 is an enlarged view of the encircle area 12 of the tenth cross-sectional view of FIG. 2.

Referring to FIGS. 1 and 2, a concrete body 10A comprises an existing substantially rigid concrete structure 12 with a top surface 14. The top surface of existing concrete surfaces are frequently contaminated with layers of dirt and other material 16. The surface 14 must be cleaned to virgin concrete to form concrete body 10B having a clean virgin concrete top surface 20. The concrete structure 12 can be a pavement, or sidewalk, or mall decking, or office building floor, or the like. The top surface 14 is swept clean of all loose debris and then physically treated or mechanically contoured to remove the upper layer of concrete together with all dirt, paint, oil, grease, and the like (collectively dirt 16 herein), to expose a fresh clean virgin concrete surface 20. A virgin concrete surface is a concrete surface that has never been previously exposed as a surface. Less than a 1/16 inch layer of concrete is removed. Although more concrete can be removed, it is not required and unnecessarily increases the cost of the present terrazzo method. The top surface 14 can be treated with a sander, a mechanical wire brush, a shot blaster for shotblasting, glass bead gun, sand blaster, mechanical scrapper, high pressure water jet, or other devices for scarifying the concrete surface. Any device that will removed the top layer of the concrete and all dirt, paint, tar, asphalt, wax, oil grease, latex compounds, form release agents, laitance, loose toppings, foreign substances and any other material that will interfere with bonding 16 will work. Glass bead blasting has been found to be satisfactory.

Preferably the treated concrete surface 20 is at least swept free of all dust and particles. Preferably it is vacuumed to remove all dust and particles.

The cleaned surface 20 is then inspected for cracks and crevices 18. Cracks and crevices are identified by number 18 even though they are of different size and filled with different materials. Cracks 18 are no wider than the thickness of a nickel. Cracks are sealed by injecting Primer into the crack to fill at least the upper portion of the crack substantially to the level of the concrete surface. Crevices are wider than the thickness of a nickel. Crevices 18 are filled with a cementious or expoxy based expansive concrete crack filler 22, such as Bonsai America's SAKRETE® concrete crack filler. SAKRETE® concrete crack filler is a mixture of calcium carbonate, zinc oxide, crystalline silica, proprietary polymer solids and proprietary additives. The crevice is filled to the level of the concrete surface. For large crevices, two or more applications of crack filler may be required. The resulting concrete body 10C has a clean roughened concrete surface 20 with all the cracks and crevices 18 filled in. If the concrete surfaces on opposing sides of the cracks or crevices are of uneven height exceeding an 1/8 of an inch, the concrete body may not be suitable for resurfacing and may have to be replaced or resurfaced with a concrete float before application of the terrazzo. If one side or both sides of a crack or crevice in a concrete body are in movement, the concrete structure will have to be replaced to have a successful terrazzo application. The concrete structure must be sound, stable and solid for a successful terrazzo finish. A moving concrete body 12 will reflect cracks through the terrazzo application. If any of the crack filler 22 is above the level of the surface 20 of the concrete by more than an 1/8 inch, it is sanded or ground down to the level of the concrete surface before the next step unless a thick terrazzo layer is to be applied, such as a terrazzo layer a half-inch or thicker.

The clean virgin concrete surface 20 of the concrete body 10C is coated with an application of a solvent-free acrylic latex primer ("Primer" herein) to form a primer coating on the clean virgin concrete surface. Solvent-free acrylic latex primers are the preferred Primer. Mapei® brand PRIMER L primer has been found to be a satisfactory Primer for the present invention. However, other concrete primers can also be sued, such as Quikrete brand concrete bonding adhesive, a vinyl ethylene copolymer/vinyl alcohol polymer primer.

The Primer is rolled on, brushed on or squeeged on to completely cover the clean virgin concrete surface 20. It is important to cover the surface 20 completely and leave no voids or holidays. The application of the Primer is made, preferably 70°±20° F. Within this temperature range the Primer sets up to a tacky state, but does not set up to a dry harden state. If the concrete structure is porous concrete, the application of Primer can be delayed 24 to 48 hours to permit the concrete to degas. If the concrete structure is porous, preferably a second application of the Primer is made over the first Primer application before the first application has dried and hardened. the coating to yield a concrete body 10D having a primer coated surface 24. Thus the second applications applied to the first Primer application when the latter is wet or in a tacky state to assure bonding between the two Primer applications. The set up time to the sticky state is approximately one hour from the last Primer application within the 70°±20° F. range.

Cementious mortar topping 28 is applied to the tacky primer coating 24 of the concrete body 10D to form concrete body 10E having a layer of mortar topping 28 on its top surface. The topping is applied to the primer coating when the latter is in a tacky state to assure bonding between the mortar topping layer and the primer coating. If a good bond is not obtained, such as because the Primer has hardened and gone beyond the tacky state, the mortar topping layer will subsequently be prone to delamination. The mortar topping is applied as a layer 28 at least about 1/8 (~3 mm) inch in thickness. The desired thickness of the mortar topping layer will be dependent upon the size decorative aggregate to be seeded in a subsequent stop. The thickness of the mortar topping layer will be from about one-half to the height of seeded troweled aggregate as further described below. The mortar topping layer is worked or troweled and screeded to form a mortar topping layer of relatively uniform thickness with a level surface to form concrete body 10E with mortar topping layer 28. This is an important step in the process because one of the advantageous of the present process arises from the fact that the mortar topping layer is worked very little after this step.

Preferably, a aggregate-free shrinkage-compensated, fast-setting cementitious mortar is used for the mortar topping. These mortars comprise principally hydraulic cement and silica sand. They are aggregate free. They can include minor amounts of polymers, such as acrylic polymers. These are fast setting shrink resistant mortars that exhibit excellent compressive strength within 4 to 8 hours. Such mortar compositions comprise silica sand and hydraulic cement, optionally with calcium aluminate, calcium carbonate, calcium sulftate and polymers, such as acrylic polymers. The compositions are normally proprietary but are widely available from a number of different suppliers. Mapei's brand Mapecem 202 has been used. Another mortar topping that is available is Quikrete brand QUIKRETE commercial grade Fastset DOT Mix mortar topping.

Before the mortar topping layer 28 sets up and hardens, and normally immediately after it has been troweled and screed, decorative aggregate 26 is seeded onto the surface of the topping to form concrete body 10F. For decorative designs, different color and/or shape aggregates are employed for design features. In the prior art terrazzo methods, the aggregate is seeded onto the surface of interest before topping is applied. The formation of the mortar topping layer requires substantial movement of the topping as it is applied and leveled out. This movement of the toping layer moves the unbound aggregate. This is very undesirable. By seeding the aggregate on top of the level topping as is carried in the present method, the craftsman can preserve the sharp boundaries between design elements because there is virtually no lateral movement of the mortar topping layer 28 subsequent to the troweling and squeeging described above.

The decorative aggregate can be virtually any hard, now-water soluble material, inert material. Preferably the material is substantially impervious to staining with common materials, such as dirt, fertilizer, cleaning agents and the like. Typical decorative aggregate include glass particulates, ceramic particulates, abalone and other sea shell particulates, marble particulates, rock particulate, stones, pebbles, coarse sand, metal particles, small metal, glass, or ceramic shapes or parts.

Depending upon the design criteria for the terrazzo finish, the aggregate can be of relatively uniform size or have a broad size range. The mortar topping layer can be thick enough to substantially cover all the aggregate or be only thick enough to cover the lower half of the largest aggregate particle to bond it. When the aggregate is substantially covered, normally only the upper most portion of the aggregate will be normally exposed in the terrazzo finish after the terrazzo operation is complete. When the largest aggregate particles are only half covered by the mortar topping, the mid-cross-section of the largest aggregate particles will be exposed in the terrazzo finish after the terrazzo operation is finished.

After the aggregate 26 is seeded on the mortar topping layer 28, the aggregate is troweled into the topping to from concrete body 10G which has a pre-terrazzo surface comprising the mortar topping layer 28 with the decorative aggregate 26 embedded in the layer to the depth of the mortar topping layer. Embedded does not necessarily mean covered, it means "to place or fix firmly in surrounding matter" (Webster's New Collegiate Dictionary, G. & C. Merriam Co., Springfield, Mass., 1975, page 370). Since troweling primarily forces the aggregate downwardly into the mortar topping layer there is very limited lateral movement of the aggregate and mortar topping layer 28.

Joints are cut into the mortar topping layer with the embedded aggregate 26 using a concrete joint cutter after the pre-terrazzo layer has set up and hardened which usually takes about four hours. The joints are cut over existing joints of the concrete body 12 to prevent reflection of the joint through the terrazzo surface. If the concrete structure is jointless, expansion and/or control joints are cut in the pre-terrazzo layer. Preferably expansion and/or control joints are cut every ten feet into the mortar topping layer 28

The mortar topping layer 28 with the embedded aggregate 26, the pre-terrazzo layer, is allowed to set up for four hours or longer. Normally the toping layer sets up in about four hours to form concrete body 10H. However in cool or wet weather, the mortar topping layer may take a longer to set up. Normally the pre-terrazzo layer can support foot traffic four hours after application of the mortar topping layer and vehicle traffic six hours after application of the mortar topping layer. Thus the pre terrazzo layer can be fabricated at night when foot and vehicle traffic can be diverted and if the mortar topping layer was applied by at least two am, foot traffic can be permitted on the pre-trazzo layer by six am and vehicle traffic by eight am. This makes it much more convenient to place a terrazzo floor on an existing concrete floor. In addition the pre-Terrazzo layer can be ⅛ inch thick with ⅛ inch aggregate. This thin terrazzo permits, in many cases, the necessity of cutting down the existing concrete floor for door threshold clearance or resetting door thresholds for clearance.

The cured hardened pre-terrazzo layer of concrete body 10H up, is ground and polished using mechanical grinders and polishers known in the terrazzo field to form the terrazzo surface 32 of the concrete body 10I. after the grinding and polishing step J, the joints 30 are filled with concrete terrazzo joint filler 34 level with the terrazzo surface 32. The Terrazzo finish can be sealed with a concrete surface sealer, such as, Mapie brand Mapefinish Wet Look acrylic concrete sealer and Quikrete brand acrylic concrete sealer.

What is claimed is:

1. A method of applying a terrazzo finish to the concrete surface of an existing concrete structure comprising the steps of:

treating the concrete surface of the concrete body by physical means to expose a clean virgin concrete surface;

filling the exposed open crevices on the surface of the concrete body substantially level with the clean virgin concrete surface with a concrete crack filler;

applying a first coating of primer over the clean virgin concrete surface;

applying a cementitious mortar topping over the first coating when the first coating is tacky to form a mortar topping layer;

screeding the mortar topping layer to form a mortar topping layer of relatively uniform thickness;

seeding decorative aggregate on the screeded mortar topping layer before its hardens to form a seeded mortar topping layer;

troweling the surface of the seeded mortar topping layer to embed the decorative aggregate in the mortar topping layer to form a aggregate/mortar topping layer with the pre-terrazzo surface;

providing joints through the aggregate/mortar topping layer contiguous with the existing joints in the concrete body;

allowing the aggregate/mortar topping layer to set up to form a cured aggregate/mortar topping layer; and finishing the pre-terrazzo surface to form a terrazzo finish on the cured aggregate/mortar topping layer.

2. The method according to claim 1 wherein the surface of the concrete body is treated with chemical cleaning agents to remove dirt and organic residue from the concrete surface.

3. The method according to claim 2 wherein the chemical cleaning agent is selected from the group consisting of a concrete etching acid, an aqueous lye solution, a trisodilum phosphate solution, or an aqueous surface solution.

4. The method according to claim 1 wherein a portion of the concrete surface of the concrete body is removed by the physical means to expose a clean virgin concrete surface on the concrete body.

5. The method according to claim 4 wherein the surface of the concrete body is treated with chemical cleaning agents to remove dirt and organic residue from the concrete surface.

6. The method according to claim 5 wherein the physical means comprises sand blasting, shot blasting, glass bead blasting, high pressure water jetting, mechanical sanding, grinding, mechanical stripping, or mechanical scrapping, sander, a mechanical wire brushing, mechanical scrapping, or means of scarifying the concrete surface.

7. The method according to claim 1 wherein the physical means comprises sand blasting, shot blasting, glass bead blasting, high pressure water jetting, mechanical sanding, grinding, mechanical stripping, or mechanical scrapping, sander, a mechanical wire brushing, mechanical scrapping, or means of scarifying the concrete surface.

8. The method according to claim 1 including the step of applying a second coating of primer over the first coating when the first coating of primer is still tacky.

9. The method according to claim 1 wherein the concrete crack filler is an epoxy or cementious expansive crack filler.

10. The method according to claim 9 wherein the epoxy or cementious expansive crack filler comprises calcium carbonate, zinc oxide, and crystalline silica.

11. The method according to claim 1 wherein the mortar topping comprises principally hydraulic cement and silica sand.

12. The method according to claim 11 wherein the mortar topping is polymer modified.

13. The method according to claim 11 wherein the mortar topping includes calcium aluminate, calcium carbonate, and calcium sulfate.

14. The method according to claim 11 wherein the mortar topping includes calcium aluminate, calcium carbonate, calcium sulfate, and acrylic polymers.

15. The method according to claim 1, wherein the decorative aggregate is elected from the group consisting of glass particulates, ceramic particulates, abalone shell particulates, marble particulates, rock particulate, stones, pebbles, coarse sand, metal particulates, small metal parts, small ceramic parts and/or small glass parts.

16. The method according to claim 1 wherein the joints provided through the seeded mortar topping layer are grouted with terrazzo cement joint grouting agent even with the ground and finished terrazzo surface.

17. The method accordingly to claim 1 wherein the pre-terrazzo surface of the cured seeded mortar topping layer is finished by grinding the pre-terrazzo surface smooth and polishing the ground pre-terrazzo surface.

18. The method according to claim 17 wherein the ground and the polished surface is sealed by the application of a concrete sealer.

19. The method accordingly to claim 17 wherein the cured smooth seeded mortar topping layer is sealed with concrete sealer after it is acid stained.

* * * * *